United States Patent
Allan et al.

(10) Patent No.: US 10,169,079 B2
(45) Date of Patent: Jan. 1, 2019

(54) TASK STATUS TRACKING AND UPDATE SYSTEM

(71) Applicant: International Business Machines Corporation, Armonk, NY (US)

(72) Inventors: Robert Allan, Raleigh, NC (US); Constance E. Smith, New York, NY (US); Thembani Togwe, Lenexa, KS (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 14/966,456

(22) Filed: Dec. 11, 2015

(65) Prior Publication Data

US 2017/0168870 A1   Jun. 15, 2017

(51) Int. Cl.
| G06F 3/048 | (2013.01) |
| G06F 9/48 | (2006.01) |
| G06F 3/0484 | (2013.01) |
| G06F 3/0482 | (2013.01) |
| G06F 3/01 | (2006.01) |

(52) U.S. Cl.
CPC .......... *G06F 9/4881* (2013.01); *G06F 3/0482* (2013.01); *G06F 3/04842* (2013.01)

(58) Field of Classification Search
CPC ............... G06F 9/4881; G06F 3/04842; G06F 17/30897; G06F 17/2785; G06F 17/30209; G06F 3/0482; G06F 8/60
See application file for complete search history.

(56) References Cited

U.S. PATENT DOCUMENTS

| 5,488,697 | A | 1/1996 | Kaemmerer et al. |
| 6,938,000 | B2 | 8/2005 | Joseph et al. |
| 7,130,885 | B2 * | 10/2006 | Chandra ................ G06Q 10/10 709/206 |
| 7,328,249 | B2 | 2/2008 | Morrow et al. |
| 7,711,671 | B2 | 5/2010 | Meyers |
| 7,711,737 | B2 | 5/2010 | Surendran |
| 8,374,871 | B2 | 2/2013 | Ehsani et al. |
| 8,423,394 | B2 | 4/2013 | Kogan et al. |
| 8,838,618 | B1 | 9/2014 | Wu et al. |
| 9,116,890 | B2 * | 8/2015 | King ................. G06F 17/30011 |
| 9,881,062 | B2 * | 1/2018 | Shiffman ............... G06N 5/025 |
| 2003/0088627 | A1 * | 5/2003 | Rothwell ................ H04L 51/12 709/206 |

(Continued)

*Primary Examiner* — Nicholas Augustine
(74) *Attorney, Agent, or Firm* — Cantor Colburn LLP

(57) ABSTRACT

Aspects include a method, a system and a computer program product for providing status updates while collaboratively resolving an issue. The method includes identifying, using a processing device, one or more key phrases in an electronic text-based message. Based on the identified one or more key phrases, at least one status-based suggestion is provided to a user to change a status milestone associated with a problem resolution. The providing of the change of milestone includes: building a table to map a key phrase to one or more status identifiers; mapping the key phrase to one or more status identifiers to associate the key phrase with the at least one status-based suggestion; and displaying a corresponding status milestone based on the user selecting from the at least one status-based suggestion.

20 Claims, 9 Drawing Sheets

(56) References Cited

U.S. PATENT DOCUMENTS

| | | | |
|---|---|---|---|
| 2007/0016614 A1* | 1/2007 | Novy | G06F 17/2229 |
| 2007/0094219 A1* | 4/2007 | Kipersztok | G06Q 10/04 |
| | | | 706/52 |
| 2008/0221866 A1 | 9/2008 | Katragadda et al. | |
| 2008/0222734 A1* | 9/2008 | Redlich | G06F 21/577 |
| | | | 726/26 |
| 2009/0006170 A1 | 1/2009 | Smith | |
| 2010/0030734 A1* | 2/2010 | Chunilal | G06F 17/30867 |
| | | | 707/770 |
| 2010/0094878 A1* | 4/2010 | Soroca | G06F 17/30035 |
| | | | 707/748 |
| 2010/0179860 A1* | 7/2010 | Noel | G06Q 30/02 |
| | | | 705/7.33 |
| 2010/0185474 A1 | 7/2010 | Frank | |
| 2011/0047160 A1* | 2/2011 | Hough | G06F 17/30902 |
| | | | 707/740 |
| 2011/0208822 A1* | 8/2011 | Rathod | G06Q 30/02 |
| | | | 709/206 |
| 2011/0258049 A1* | 10/2011 | Ramer | G06F 17/30867 |
| | | | 705/14.66 |
| 2012/0022950 A1* | 1/2012 | Gilbert | G06Q 30/0241 |
| | | | 705/14.66 |
| 2012/0266258 A1* | 10/2012 | Tuchman | H04L 63/104 |
| | | | 726/28 |
| 2012/0290950 A1* | 11/2012 | Rapaport | H04L 51/32 |
| | | | 715/753 |
| 2012/0296845 A1* | 11/2012 | Andrews | G06Q 40/06 |
| | | | 705/36 R |
| 2013/0249948 A1* | 9/2013 | Reitan | G06F 3/011 |
| | | | 345/633 |
| 2014/0358944 A1* | 12/2014 | Brower, Jr. | G06F 17/30861 |
| | | | 707/748 |
| 2017/0034087 A1* | 2/2017 | Borenstein | H04L 51/08 |

* cited by examiner

| Keyword or Phrase | Status |
|---|---|
| Done | Closed |
| I have a problem | New |
| We'll work on this together | Assemble Team |
| We need to work through this | Analyze |
| Let's do this | Decide |
| Nice work | Resolved |
| Sponsor | New |

FIG. 9

TASK STATUS TRACKING AND UPDATE SYSTEM

BACKGROUND

The present invention relates generally to system and method for collaborative problem solving and, more specifically, to a system and method for tracking and updating a milestone status.

Collaborative problem solving involves bringing teams of personnel together for the common purpose of accomplishing a goal. Often, these problems are systematically tracked so the status of effort may be known to those managing the problem. A number of tools have been used for tracking teams, such a GANTT Charts for example, where the problem is broken down into a series of tasks or elements with start and end dates. As the efforts of the team progress, a team member or program manager manually updates data for the elements so that the current status may be determined.

SUMMARY

Embodiments include a method, system, and computer program product for providing status updates while collaboratively resolving an issue. A method includes identifying, using a processing device, one or more key phrases in an electronic text-based message. Based on the identified one or more key phrases, at least one status-based suggestion is provided to a user to change a status milestone associated with a problem resolution. The providing of the change of milestone includes: building a table to map a key phrase to one or more status identifiers; mapping the key phrase to one or more status identifiers to associate the key phrase with the at least one status-based suggestion; and displaying a corresponding status milestone based on the user selecting from the at least one status-based suggestion.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 9 depicts a milestone directory for correlating keywords and phrases with a status, according to some embodiments of this disclosure.

DETAILED DESCRIPTION

Figure 1:
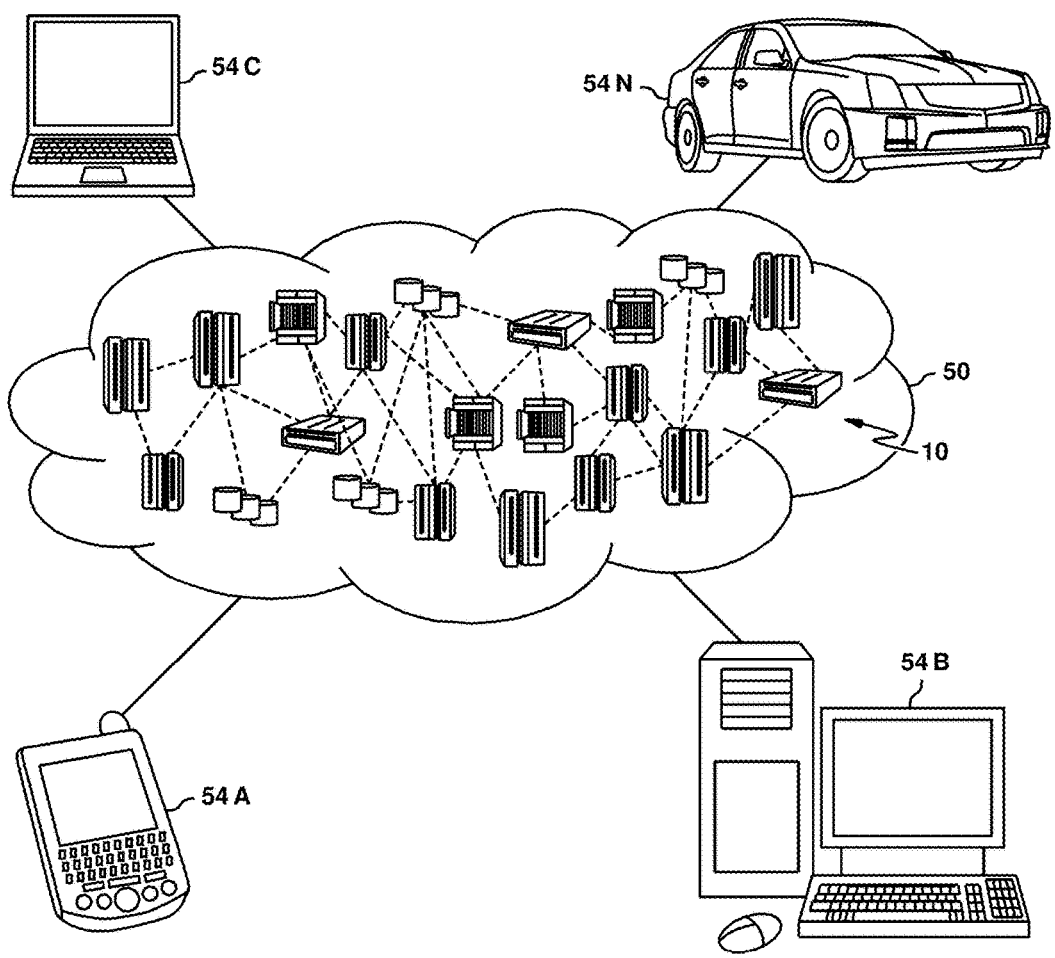
FIG. 1 depicts a cloud computing environment according to an embodiment of the present invention.

Embodiments of this disclosure provide for a system and method that facilitates the automated assignment of a status or changing of a status of a collaborative issue based on communications between team members. Embodiments of this disclosure provide for a system and method for associating keywords and phrases with a task status of a collaborative issue. Still further embodiments of this disclosure provide for a task owner oversight of task status changes of a collaborative issue. Embodiments of this disclosure avoid having team members manually update data or not regularly updating status' to maintain an accurate status levels for tasks of a collaborative issue.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, wearable devices and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
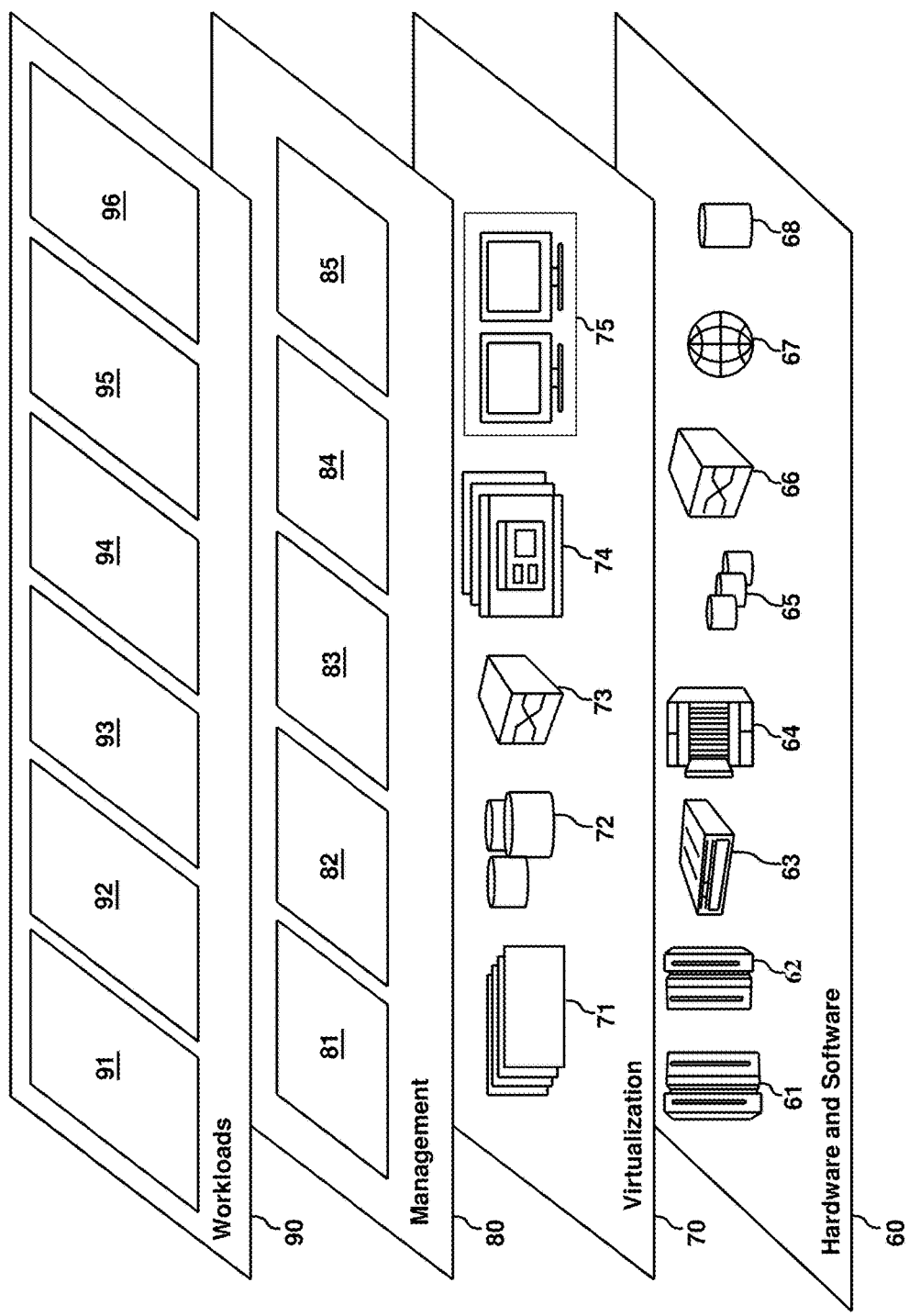
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and project or task management 96. As discussed in more detail herein, the task management 96 workload provides for the monitoring of communications between team members and facilitates the assignment or changing of task status' in response to keywords or phrases within the communications.

Figure 3:
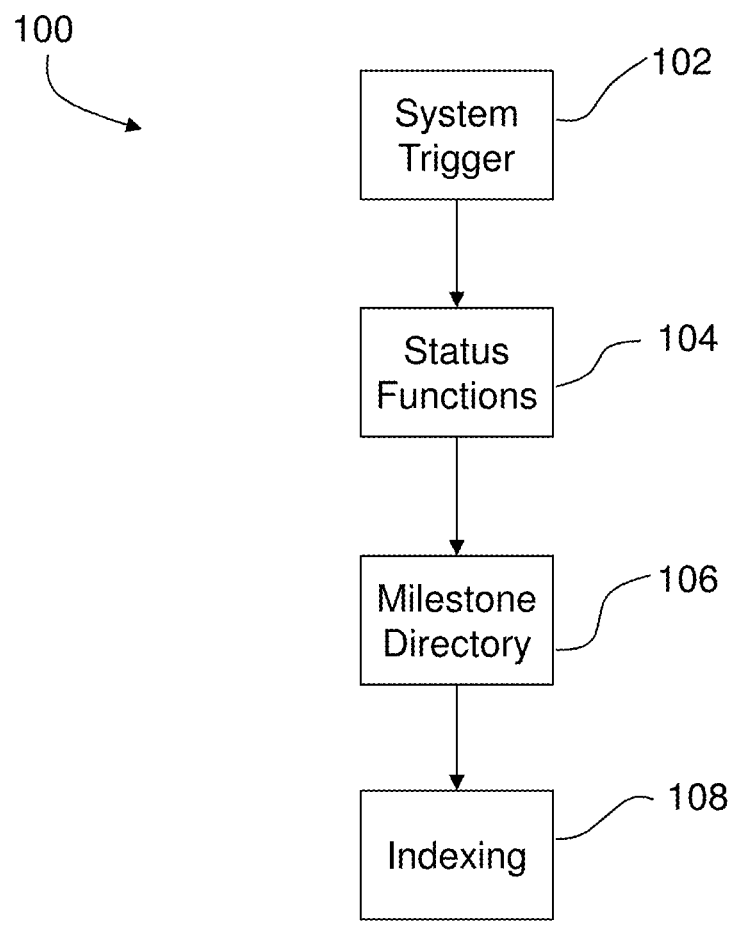
FIG. 3 depicts a flow diagram of a method for implementing some or all aspects of the system, according to some embodiments of this disclosure.

Referring now to FIG. 3, a method 100 is shown for providing status updates while resolving a collaborative issue. The method 100 starts with a trigger in block 102. The system trigger identifies a change in the status of the collaborative issue using a collaborative messaging system, such as a text chat, an electronic mail system or a social computer network messaging system for example. In an embodiment, the triggers include identifying a linear progression of a step to the next status. The triggers can also include identifying that a status step is skipped or omitted. For example, depending on the problem, the team may progress directly from an "analyze" status to a "closed" status allowing for the omitting of the "decide" and "resolve" statuses. The triggers can further identify the reversion of a step. For example, during an "analysis" phase, the team may determine that additional team members (perhaps having additional skill sets) need to be added and the status reverts to an earlier status.

The method 100 then proceeds to block 104 where the system performs a predetermined function. In an embodiment, the method 100 provides a suggestion to change a status milestone associated with a problem resolution. In an embodiment, the method 100 automatically routes the status milestone change to an approver, such as a task owner or a project manager. In still another embodiment, the method 100 automatically changes the status milestone based on the language used by participants in a messaging system such as a chat message or an electronic mail.

The method 100 then proceeds to block 106 where a status milestone directory is created. The milestone directory is a method whereby the association of keywords and phrases used in the messaging system with status milestones. In an embodiment, the milestone directory may be manually created or initially seeded with some associations, such as the look-up table shown in FIG. 8 for example. In this embodiment, the user populates the directory with popular or common words or phrases that indicate a change in the milestone status. For example, the word "done" may be associated with the milestone status "closed." In another embodiment, the milestone directory may be generated on an index based arrangement wherein the user manually sets the status during group chats or electronic mail to generate the associations. In another embodiment, the milestone directory may be generated automatically by the identifying close phrases when a match is found. The identification of close phrases may include the use of cognitive computing or machine learning. In a non-limiting embodiment, the machine learning may include a neural network. With the neural network, training data such as the manually generated associates is applied to the neural network to determine similar or close phrases. In an embodiment, cognitive computing is the simulation of human thought processes in a computerized model. Cognitive computing may also involve self-learning systems that use data mining, pattern recognition and natural language processing to mimic the way the human brain works.

The method 100 then proceeds to block 108 where the keyword and phrase association with milestone statuses are indexed. In an embodiment, the indexing may be a count of keywords tagged during a chat session or an electronic mail message. In another embodiment, the indexing may be based on the iterative identification of phrases.

Figure 4:
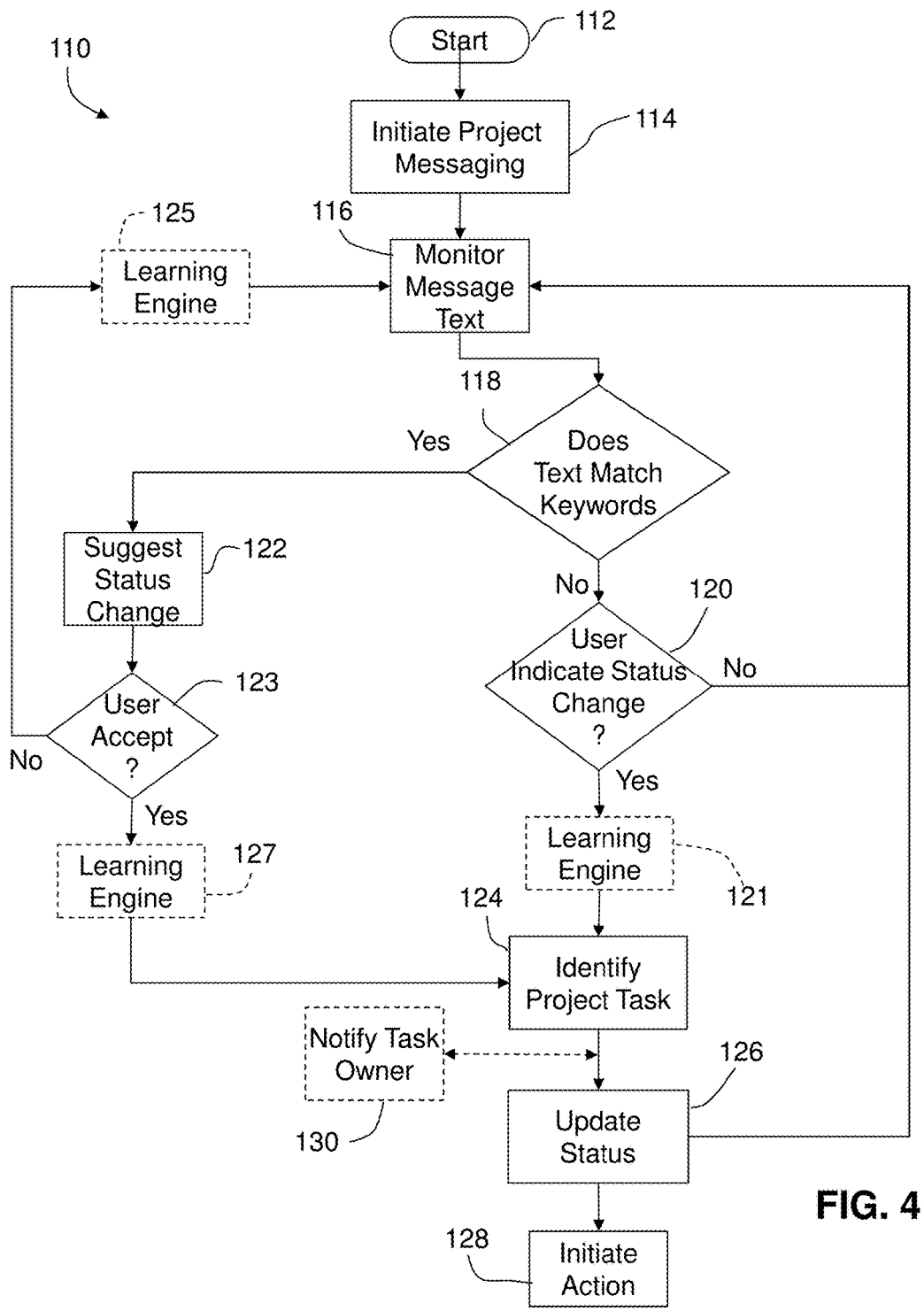
FIG. 4 depicts a flow diagram of another method for implementing some or all aspects of the system, according to some embodiments of this disclosure.

Referring now to FIG. 4, another method 110 is provided for updating milestone statuses in the resolving of a collaborative issue. The method 110 starts in block 112 and proceeds to block 114 where electronic communications, such as a group chat or electronic mail is initiated. It should be appreciated that while embodiments herein describe the electronic communications as being a text based communication, this is for clarity purposes and the claims should not be so limited. In other embodiments, the electronic communications may include audio or voice based electronic communications or video based communications. In these embodiments, the audio or voice communications may be automatically transcribed into a textual transcript that may be analyzed to identify keywords and phrases. Further, the electronic communications may be transmitted via a public or private social computer network that allows for transmission of messages between users/members. The electronic communications are monitored in block 116.

The method 110 then proceeds to query block 118 where it is determined whether the text of the electronic communication matches a keyword or phrase. When query block 118 returns a positive, the method 110 proceeds to block 122 where suggested milestone status changes are displayed for the user. The method 110 then proceeds to query block 123. When query block 123 returns a negative, meaning the user indicates that no status change is warranted, the method 110 loops back to block 116. In an embodiment, the declining of the status change is transmitted to a learning engine in block 125. In an embodiment, the declining of a positive correlation is used as training data with a machine learning engine. In an embodiment the method may de-index the suggested milestone status change association in the milestone directory. When query block 123 returns a positive, the method 110 proceeds to block 124. In an embodiment, the acceptance of the status change is transmitted to a learning engine in block 127. In an embodiment, the acceptance of a positive correlation is used as training data with a machine learning engine.

Figure 5:
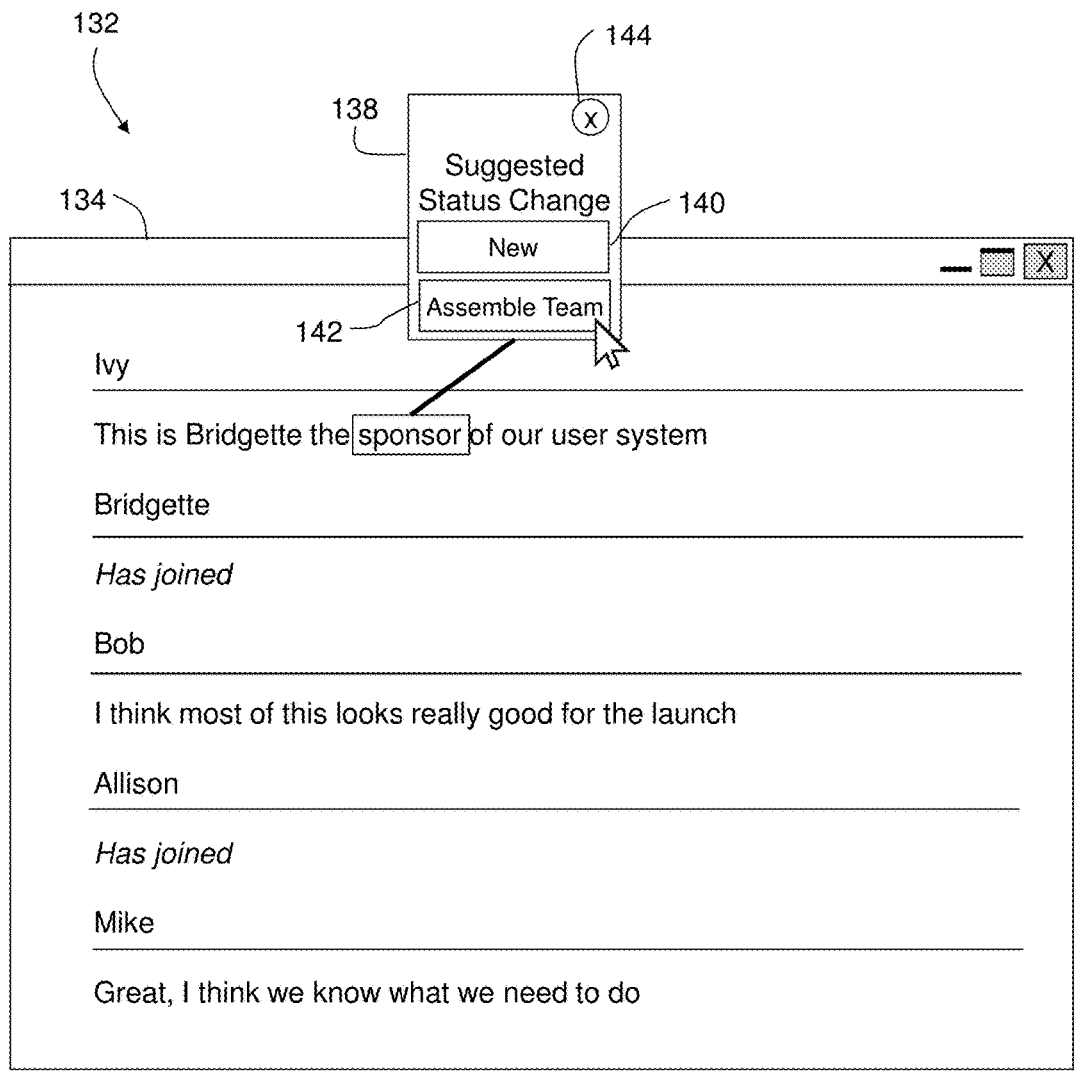
FIG. 5 depicts a graphical user interface for an electronic communications and a prompt suggesting a status change.

An embodiment of a screen display 132 is shown in FIG. 5 for an electronic communications session 134. In this embodiment, in the text of the electronic communications it is noted that a keyword (e.g. sponsor) is entered that matches a keyword in the milestone directory 136 (FIG. 9). The method 110 then displays a dialog box 138 providing suggested status changes "New" 140 and "Assemble Team" 142. If the user does not desire to change the milestone status, or if the suggested milestone statuses are not appropriate in the context of this electronic communication, then the user may dismiss the dialog box 138 by selecting the close button 144. It should be appreciated that the illustrated graphical user interface is for exemplary purposes and other interfaces may be used to display the suggested changes.

In an embodiment, when a keyword or phrase is identified, the keyword or phrase is underlined or highlighted. This draws the user's attention to the potential status change. By right-clicking on the underlined or highlighted keyword, the user may cause the dialog box 138 to be displayed and the desired milestone status selected.

Figure 6:
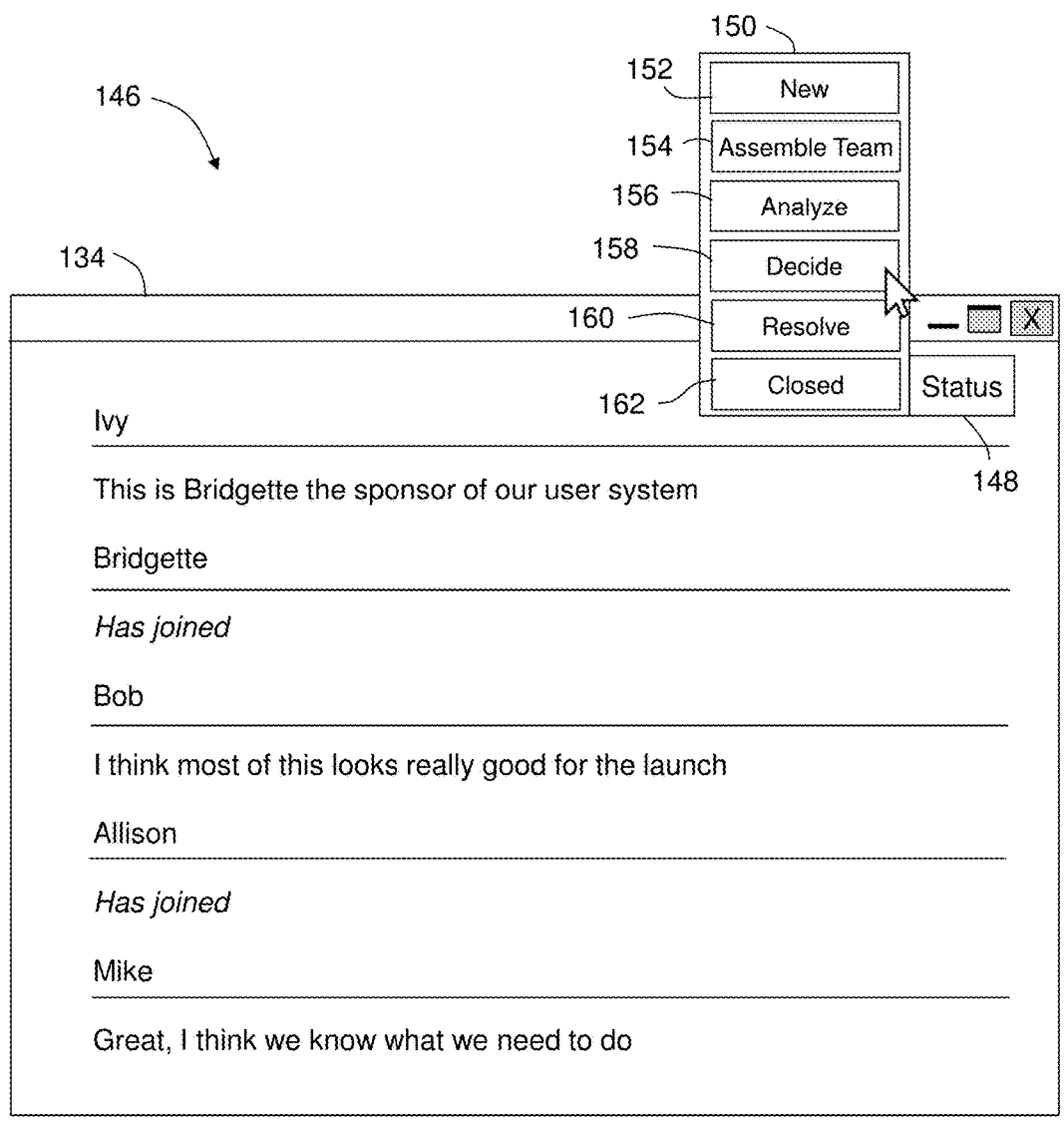
FIG. 6 depicts a graphical user interface for an electronic communications and a prompt for assigning a status to the communication, according to some embodiments of this disclosure.

In an embodiment, when the query block 118 returns a negative, the method 110 proceeds to query block 120 where it is determined if the user has indicated a status change should be made. When query block 120 returns a negative, the method 110 loops back to block 116. When query block 120 returns a positive, this indicates that the user desires to define or indicate a status change. In one embodiment, the user indicated status change is transmitted to a learning engine in block 121. In an embodiment, the creation of a positive correlation (a manual match is made) is used as training data with a machine learning engine. In the exemplary embodiment, the user may indicate the status change using several methods. Referring to FIG. 6, an embodiment is shown of a screen display 146 or graphical user interface wherein the user can indicate that the entire electronic communication (e.g. the chat) indicates a status change. In one embodiment, the screen display 146 includes a status change button 148. Selecting the button 148 causes a selection box 150 to be displayed that includes the available milestone statuses, such as but not limited to "New" 152, "Assemble Team" 154, "Analyze" 156, "Decide" 158, "Resolve" 160 and "Closed" 162. The user can then select one of the milestone statuses.

Figure 7:
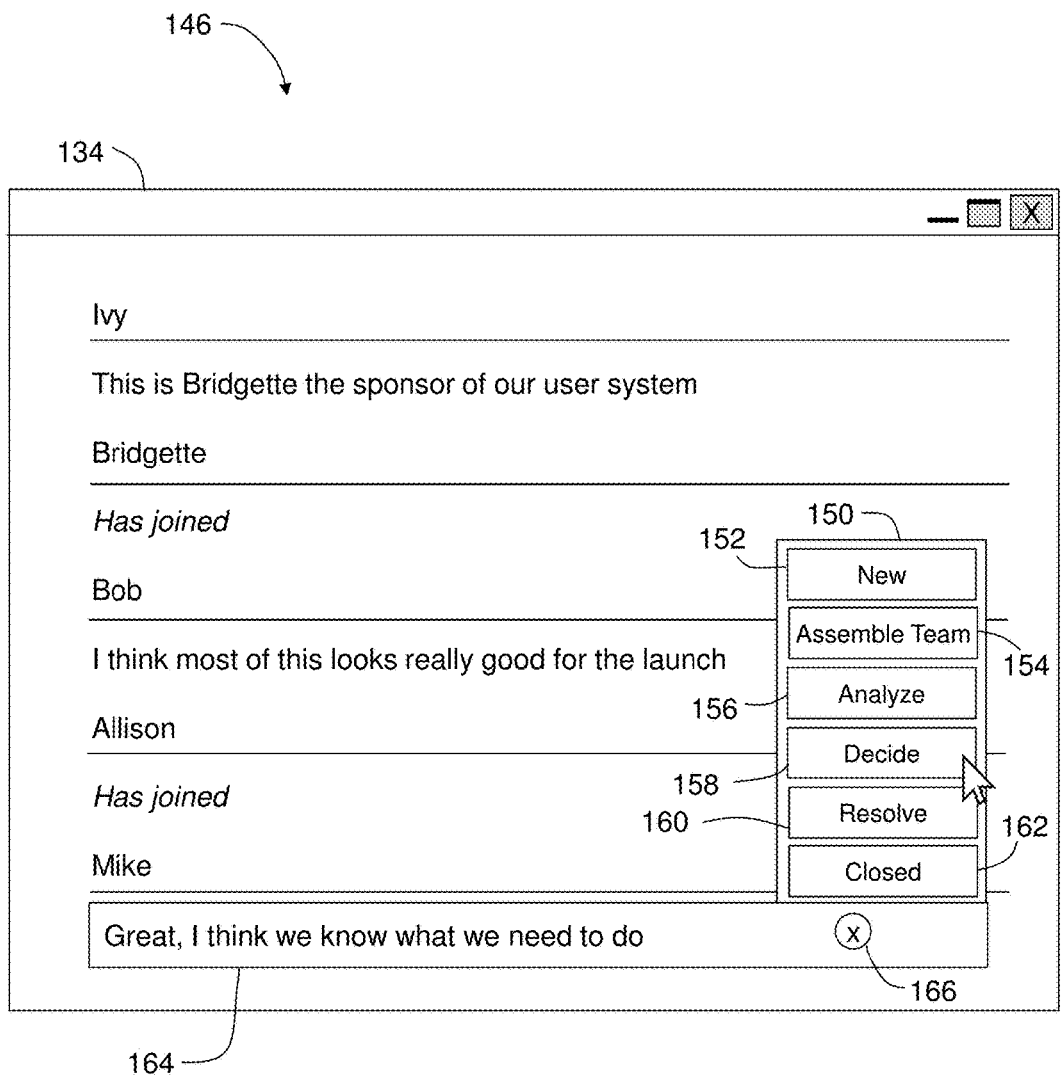
FIG. 7 depicts a graphical user interface for an electronic communications and a prompt for assigning a status to a portion of the communication, according to some embodiments of this disclosure.

FIG. 7 shows another embodiment of the screen display 146 wherein the user desires to associate a portion of the electronic communication, such as the message from another user (e.g. "Mike"). In this embodiment, the user selects or highlights the message 164 and indicates which status change is desired, such as by right-clicking with the mouse or using a keyboard and pressing a key combination for example. The selection box 150 may then be displayed that includes the available milestone statuses, such as those discussed above (e.g. "New" 152, "Assemble Team" 154, "Analyze" 156, "Decide" 158, "Resolve" 160 and "Closed" 162). The user can then select one of the milestone statuses. If the user changes their mind, the selection box 150 may be dismissed by selecting the close button 166.

Figure 8:
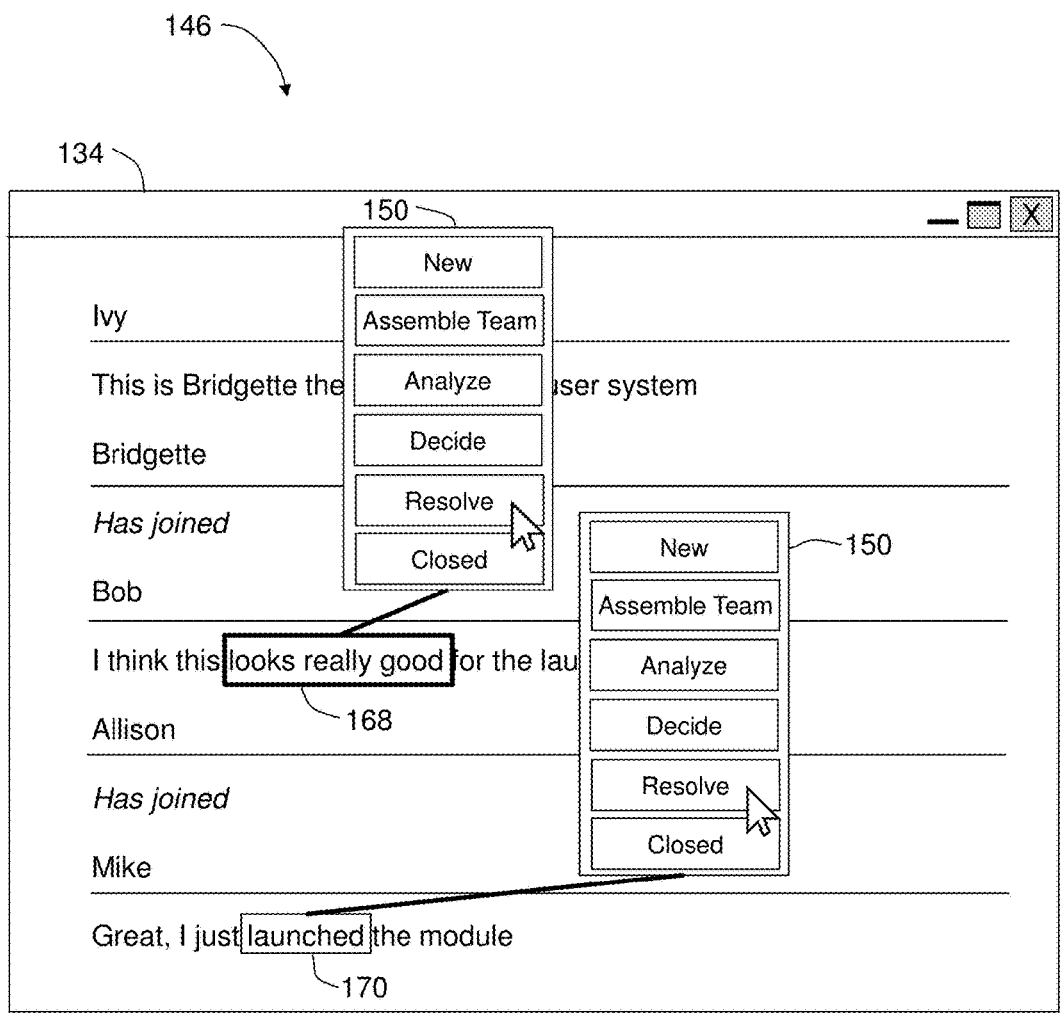
FIG. 8 depicts a graphical user interface for an electronic communications and a prompt for assigning a status to phrases within the communication, according to some embodiments of this disclosure.

FIG. 8 shows still another embodiment of screen display 146 where the user wants to associate either a phrase 168 or a keyword 170. This embodiment, similar to the embodiment of FIG. 7 may be initiated by the user selecting either the phrase 168 or keyword 170 and right clicking with a mouse or pressing a keyboard key combination. The selection box 150 is then displayed and the user selects the appropriate milestone status.

In an embodiment the words and phrases selected by the user may be used to train the system to recognize new phrases in the future to enable the system to suggest status changes based on these words. For example, when the user selects a chat (FIG. 6), a message (FIG. 7) or keywords (FIG. 8), the words selected by the user and associated with milestone status may be used in as training data to improve a cognitive computing, learning or recognition engine that analyzes the electronic communications as well as the milestone directory 136.

In an embodiment, to choose the phrase, the user may select an "add phrase" user interface button or control. In another embodiment, the user may add a phrase by right clicking with the mouse or by using a combination of key-strokes (e.g. Control-A). In still another embodiment, the system may suggest phrases to add by displaying a list of options for the user to choose from. In an embodiment, the list of options may be continuously updated by the system as the user types or receives messages.

After the user selects the status change, either from the suggestion in block 122 or the user initiated change in query block 120, the method 110 proceeds to block 124 where the milestone status change is associated with the collaborative problem being addressed or a task, such as a task associated with a larger project plan for example. In one embodiment, when a user initiates a milestone status change, the method 110 transmits a notification to a second user in block 130, such as a task owner, a problem owner or a program manager for example. In an embodiment, the second user may choose between authorizing the milestone status change and denying the milestone status change. In an embodiment, the notification to the second user is informational and no action is performed by the second user.

The method 110 then proceeds to block 126 where the status is updated. In one embodiment, the method 110 bifurcates with one portion of the method looping back to block 116 to continue monitoring the electronic communication. The other portion of the method 110 proceeds to block 128 where an action is initiated in response to the status being updated. For example, when a status related to a design of a component is changed to "Closed", the system may automatically initiate or release other associated activities or tasks, such as releasing request for quotes (RFQ's) to suppliers to fabricate the component for example.

Referring now to FIG. 9, an exemplary milestone directory 136. In an embodiment, the milestone directory 136 is in the form of a look-up table. The milestone directory 136 may include an array having a first data set 172, such as the keyword or phrase for example, and a second data set 174, such as the milestone status. The milestone directory 136 may also be in the form of a relational database. As discussed herein, this look-up table may be built by manually associating the keywords and phrases with the milestone statuses. In some embodiments, machine learning techniques may be used to improve or expand the look-up table based on usage by the users. The machine learning process allows the associating of new key phrases with at least one status-based suggestion based on statistical frequency of association of key phrases with a manually applied status.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing status updates while collaboratively resolving an issue, the method comprising:
   receiving, using a processing device, an electronic text-based message from a user;

identifying, using the processing device, one or more key phrases in the electronic text-based message, wherein the one or more key phrases are identified based at least in part on training a neural network using training data and applying the neural network to the electronic text-based message, wherein the training data includes key phrases manually indicated by a user;

in response to identifying the one or more key phrases in the received electronic text-based message, automatically displaying, by the processing device, the one or more key phrases to the user with highlighted text;

receiving, by the processing device, a selection from a user of a displayed key phrase from the one or more key phrases that were displayed with highlighted text; and in response to the user selecting, the displayed key phrase from the one or more key phrases displayed with highlighted text, providing at least one status-based suggestion to the user to change a status milestone associated with a problem resolution based on the user selected key phrase;

wherein the providing of the at least one status-based suggestion to the user based on the user selected key phrase comprises:

building a table to map a key phrase to one or more status identifiers;

mapping the key phrase to one or more status identifiers to associate the key phrase with the at least one status-based suggestion;

in response to the user selecting the displayed key phrase having highlighted text, matching the highlighted text to the key phrase of the table to identify the at least one status-based suggestion that is associated with the matching key phrase in the table and then displaying the at least one status-based suggestion to the user for selection; and displaying a corresponding status milestone based on the user selecting from the at least one status-based suggestion.

2. The method of claim 1, wherein in the providing, building the table comprises receiving key phrases manually indicated by the user, and mapping the key phrase comprises manually mapping the identified one or more key phrases to one or more status identifiers to associate the identified one or more key phrases with at least one status based suggestion.

3. The method of claim 1 wherein in the providing, building the table comprises machine learning of at least one new key phrase to update the table, thereby associating the at least one new key phrase with the at least one status-based suggestion based on statistical frequency of association of key phrases with a manually applied status.

4. The method of claim 1 wherein in the providing, the suggestion to the user to change the status milestone includes a suggestion to omit one or more subsequent status milestones.

5. The method of claim 1 wherein in the providing, the suggestion to the user to change the status milestone includes a suggestion to revert to a previous status milestone.

6. The method of claim 1 further comprising:
transmitting to a second user the status milestone selected by the user; and
based on the transmitted status milestone, approving the transmitted status milestone by the second user prior to displaying the corresponding status milestone.

7. The method of claim 1 wherein the identifying of the one or more key phrases enables unilaterally provisioning computing capabilities to change the status milestone associated with the problem resolution.

8. A system for providing status updates while collaboratively resolving an issue, the system comprising:
a memory having computer readable instructions; and
one or more processors for executing the computer readable instructions, the computer readable instructions comprising:

receiving, using a processing device, an electronic text-based message from a user;

identifying, using the processing device, one or more key phrases in the electronic text-based message, wherein the one or more key phrases are identified based at least in part on training a neural network using training data and applying the neural network to the electronic text-based message, wherein the training data includes key phrases manually indicated by a user;

in response to identifying the one or more key phrases in the received electronic text-based message, automatically displaying, by the processing device, the one or more key phrases to the user with highlighted text;

receiving, by the processing device, a selection from a user of a displayed key phrase from the one or more key phrases that were displayed with highlighted text; and in response to the user selecting the displayed key phrase from the one or more key phrases displayed with highlighted text, providing at least one status-based suggestion to the user to change a status milestone associated with a problem resolution based on the user selected key phrase;

wherein the providing of the at least one status-based suggestion to the user based on the user selected key phrase comprises:

building a table to map a key phrase to one or more status identifiers;

mapping the key phrase to one or more status identifiers to associate the key phrase with the at least one status-based suggestion;

in response to the user selecting the displayed key phrase having highlighted text, matching the highlighted text to the key phrase of the table to identify the at least one status-based suggestion that is associated with the matching key phrase in the table and then displaying the at least one status-based suggestion to the user for selection; and displaying a corresponding status milestone based on the user selecting from the at least one status-based suggestion.

9. The system of claim 8 wherein in the providing, building the table comprises receiving key phrases manually indicated by the user, and mapping the key phrase comprises manually mapping the identified one or more key phrases to one or more status identifiers to associate the identified one or more key phrases with at least one status based suggestion.

10. The system of claim 8 wherein in the providing, building the table comprises machine learning of at least one new key phrase to update the table, thereby associating the at least one new key phrase with the at least one status-based suggestion based on statistical frequency of association of key phrases with a manually applied status.

11. The system of claim 8 wherein in the providing, the suggestion to the user to change the status milestone includes a suggestion to omit one or more subsequent status milestones.

12. The system of claim 8 wherein in the providing, the suggestion to the user to change the status milestone includes a suggestion to revert to a previous status milestone.

13. The system of claim 8 wherein the computer readable instructions further comprise:
- transmitting to a second user the status milestone selected by the user; and
- based on the transmitted status milestone, approving the transmitted status milestone by the second user prior to displaying the corresponding status milestone.

14. The system of claim 8 wherein the identifying of the one or more key phrases enables unilaterally provisioning computing capabilities to change the status milestone associated with the problem resolution.

15. A computer program product for providing status updates while collaboratively resolving an issue, the computer program product comprising a computer readable storage medium having program instructions embodied therewith, the program instructions executable by a processor to cause the processor to perform:
- receiving, using a processing device, an electronic text-based message from a user;
- identifying, using the processing device, one or more key phrases in the electronic text-based message, wherein the one or more key phrases are identified based at least in part on training a neural network using training data and applying the neural network to the electronic text-based message, wherein the training data includes key phrases manually indicated by a user;
- in response to identifying the one or more key phrases in the received electronic text-based message, automatically displaying, by the processing device, the one or more key phrases to the user with highlighted text;
- receiving, by the processing device, a selection from a user of a displayed key phrase from the one or more key phrases that were displayed with highlighted text; and
- in response to the user selecting the displayed key phrase from the one or more key phrases displayed with highlighted text, providing at least one status-based suggestion to the user to change a status milestone associated with a problem resolution based on the user selected key phrase;

wherein the providing of the at least one status-based suggestion to the user based on the user selected key phrase comprises:
- building a table to map a key phrase to one or more status identifiers;
- mapping the key phrase to one or more status identifiers to associate the key phrase with the at least one status-based suggestion;
- in response to the user selecting the displayed key phrase having highlighted text, matching the highlighted text to the key phrase of the table to identify the at least one status-based suggestion that is associated with the matching key phrase in the table and then displaying the at least one status-based suggestion to the user for selection; and
- displaying a corresponding status milestone based on the user selecting from the at least one status-based suggestion.

16. The computer program product of claim 15 wherein in the providing, building the table comprises receiving key phrases manually indicated by the user, and mapping the key phrase comprises manually mapping the identified one or more key phrases to one or more status identifiers to associate the identified one or more key phrases with at least one status based suggestion.

17. The computer program product of claim 15 wherein in the providing, building the table comprises machine learning of at least one new key phrase to update the table, thereby associating the at least one new key phrase with the at least one status-based suggestion based on statistical frequency of association of key phrases with a manually applied status.

18. The computer program product of claim 15 wherein in the providing, the suggestion to the user to change the status milestone includes a suggestion to omit one or more subsequent status milestones.

19. The computer program product of claim 15 wherein in the providing, the suggestion to the user to change the status milestone includes reverting to a previous status milestone.

20. The computer program product of claim 15 wherein the program instructions executable by a processor further comprise:
- transmitting to a second user the status milestone selected by the user; and
- based on the transmitted status milestone, approving the transmitted status milestone by the second user prior to displaying the corresponding status milestone.

* * * * *